United States Patent
Moro

(10) Patent No.: US 8,800,379 B2
(45) Date of Patent: *Aug. 12, 2014

(54) "X" WIRED ANEMOMETRIC PROBE AND ITS MANUFACTURING METHOD

(75) Inventor: Jean-Paul Moro, Saint Beron (FR)

(73) Assignee: Commissariat a l'Energie Atomique et aux Energies Alternatives, Paris (FR)

(*) Notice: Subject to any disclaimer, the term of this patent is extended or adjusted under 35 U.S.C. 154(b) by 245 days.

This patent is subject to a terminal disclaimer.

(21) Appl. No.: 13/140,821

(22) PCT Filed: Dec. 18, 2009

(86) PCT No.: PCT/EP2009/067577
§ 371 (c)(1), (2), (4) Date: Aug. 30, 2011

(87) PCT Pub. No.: WO2010/070119
PCT Pub. Date: Jun. 24, 2010

(65) Prior Publication Data
US 2011/0303002 A1    Dec. 15, 2011

(30) Foreign Application Priority Data
Dec. 19, 2008 (FR) ...................................... 08 58879

(51) Int. Cl.
*G01L 7/00* (2006.01)
*B23P 17/04* (2006.01)

(52) U.S. Cl.
USPC .............................................. 73/756; 29/592

(58) Field of Classification Search
None
See application file for complete search history.

(56) References Cited

U.S. PATENT DOCUMENTS

| | | | |
|---|---|---|---|
| 2,870,305 | A | 1/1959 | Sung-Ching |
| 3,408,859 | A | 11/1968 | Konen |
| 3,634,757 | A | 1/1972 | Monomakhoff |
| 3,859,594 | A | 1/1975 | Grindheim |
| 4,517,735 | A | 5/1985 | Watkins |
| 4,685,331 | A | 8/1987 | Renken et al. |
| 4,860,583 | A | 8/1989 | Olson |
| 4,901,018 | A | 2/1990 | Lew |
| 5,053,692 | A | 10/1991 | Craddock |
| 5,441,343 | A | 8/1995 | Pylkki |

(Continued)

FOREIGN PATENT DOCUMENTS

| | | |
|---|---|---|
| EP | 0522496 A2 | 1/1993 |
| JP | S62-17626 A | 1/1987 |

(Continued)

OTHER PUBLICATIONS

Andreopoulos, J. et al., "Experimental Investigation of Jets in a Crossflow," Journal of Fluids Mechanics, vol. 138, 1984, pp. 93-127.

(Continued)

*Primary Examiner* — Andre Allen
(74) *Attorney, Agent, or Firm* — Nixon Peabody LLP

(57) ABSTRACT

A method for manufacturing a single-wire anemometric probe, or an n-wire (n>1) probe, for making measurements near a surface, comprising, for at least one of the wires: a) positioning and holding of a straight portion of the wire, comprising a metal core surrounded by a protective sheath, on two surfaces; b) elimination of a part of the sheath, to expose an active wire measurement zone; and c) the wire is soldered on two pins of the probe body.

19 Claims, 10 Drawing Sheets

(56) References Cited

U.S. PATENT DOCUMENTS

| | | | |
|---|---|---|---|
| 6,810,345 B2 | 10/2004 | Matsumura et al. | |
| 7,380,471 B2 | 6/2008 | Geller | |
| 7,915,567 B2* | 3/2011 | Lhuillier | 219/545 |
| 2003/0154781 A1 | 8/2003 | Matsumura | |
| 2004/0040386 A1* | 3/2004 | Higgins | 73/861.85 |
| 2007/0090836 A1 | 4/2007 | Xiang et al. | |
| 2007/0296413 A1 | 12/2007 | Park et al. | |
| 2008/0034861 A1 | 2/2008 | Bognar | |
| 2010/0253364 A1* | 10/2010 | Ganesh | 324/543 |
| 2011/0308312 A1* | 12/2011 | Moro | 73/204.27 |

FOREIGN PATENT DOCUMENTS

| | | |
|---|---|---|
| JP | 03-24973 B2 | 4/1991 |
| JP | H11-183414 A | 7/1999 |
| JP | 2979742 B2 | 9/1999 |
| JP | 3042040 B2 | 3/2000 |
| JP | 2060608 B2 | 4/2000 |
| JP | 3060607 B2 | 4/2000 |
| JP | 3061034 B2 | 4/2000 |
| JP | 3120478 B2 | 10/2000 |
| JP | 2607815 Y2 | 6/2002 |

OTHER PUBLICATIONS

Andreopoulos, J., "Heat Transfer Measurements in a Heated Jet-Pipe Flow Issuing into a Cold Cross Stream," Phys. Fluids, vol. 26, No. 11, 1983, pp. 3201-3210.
Browne, W. B. et al., "Effect of Wire Length on Temperature Statistics in a Turbulent Wake," Experiments in Fluids, vol. 5, No. 6, 1987, pp. 426-428.
Collis, D.C. et al. "Two-Dimensional Convection From Heated Wires at Low Reynolds Numbers," J. Fluid Mech., vol. 6, 1959, pp. 357-384.
Comte-Bellot, G. et al., "On Aerodynamic Disturbances Caused by Single Hot-Wire Probes," ASME, Journal of Applied Mechanics, vol. 38, 1971, pp. 767-774.
Dames, C. et al., "A Hot-Wire Probe for Thermal Measurements of Nanowires and Nanotubes Inside a Transmission Electron Microscope," Review of Scientific Instruments, AIP, Melville, NY, vol. 78, No. 10, Oct. 11, 2007, pp. 104903-1-104903-13.
Erm, L. P., "Modifications to a Constant-Temperature Hot-Wire Anemometer System to Measure Higher-Order Turbulence Terms Using Digital Signal Processing," Department of Defense, Air Operations Division, Aeronautical and Maritime Research Laboratory, Commonwealth of Australia, Sep. 1, 1997, 42 pages.
Ligrani, P. M., "Fabrication and Testing of Subminiature Multi-Sensor Hot-Wire Probes," Journal of Physics E. Scientific Instrument, IOP Publishing, Bristol, GB, vol. 22, No. 4, Apr. 1, 1989, pp. 262-268.
Ligrani, P.M, "Subminiature Hot-Wire Sensors: Development and Use," Journal of Physics E. Scientific Instruments, vol. 20, No. 3, Mar. 1, 1987, pp. 323-332.
Sarma, G. R., "Transfer Function Analysis of the Constant Voltage Anemometer," Review of Scientific Instruments, vol. 69, No. 6, 1998, pp. 2385-2391.
Smits A. J. et al., "The Response to Temperature Fluctuations of a Constant-Current Hot-Wire Anemometer," Journal of Physics E. Scientific Instruments, vol. 11, No. 9, Sep. 1, 1978, pp. 909-914.
Tavoularis, S., "Chapter 11: Measurement of Local Flow Velocity ED," Measurement in Fluid Mechanics, Cambridge University Press, Jan. 1, 2005, pp. 249-264.
Willmarth, W. W. et al., "Study of Turbulent Structure With Hot Wires Smaller Than the Viscous Length," J. Fluid Mech., vol. 142, 1984, pp. 121-149.
French Search Report in French Application No. FR 0858879, mailed Aug. 13, 2009.
French Search Report in French Application No. FR 0858874, mailed Aug. 12, 2009.
International Search Report and Written Opinion in PCT Application No. PCT/EP2009/067583, mailed Feb. 4, 2010.
International Search Report and Written Opinion in PCT Application No. PCT/US2009/067577, mailed Feb. 5, 2010.
International Preliminary Report on Patentability in PCT Application No. PCT/EP2009/067583, dated Jul. 5, 2011.
International Preliminary Report on Patentability in PCT Application No. PCT/US2009/067577, dated Jun. 14, 2011.
Chinese Office Action in Chinese Application No. 200980156328.X mailed on Apr. 3, 2013.
Japanese Office Action in Japanese Application No. 2011-541488, mailed on Jun. 11, 2013.
Office Action for U.S. Appl. No. 13/140,808 dated Jan. 27, 2014.
Office Action in U.S. Appl. No. 13/140,808, mailed on Jun. 16, 2014.
Notice of Allowance in Japanese Patent Application No. 2011-541489, mailed on Apr. 15, 2014.

* cited by examiner

С# "X" WIRED ANEMOMETRIC PROBE AND ITS MANUFACTURING METHOD

CROSS REFERENCE TO RELATED APPLICATIONS OR PRIORITY CLAIM

This application is a National Phase of PCT/EP2009/067577, filed Dec. 18, 2009, entitled, "ANEMOMETER PROBE HAVING ONE OR MORE WIRES AND ITS METHOD OF PRODUCTION", and which claims priority of, French Patent Application No. 08 58879, filed Dec. 19, 2008, the contents of which are incorporated herein by reference in their entirety.

TECHNICAL DOMAIN AND PRIOR ART

The invention relates to the domain of probes for making anemometric measurements near a surface.

More particularly, it relates to hot wire or cold wire anemometer type probes or devices.

It also relates to a method for manufacturing such a probe.

It also relates to a power supply regulation and measurement device for such a probe.

The principle of hot wire anemometry will now be briefly summarised: with this technique, a very thin metal wire with a diameter usually of the order of 2 to 5 μm, is heated by the Joule effect. If it is placed in a flow with a temperature below the wire temperature, the wire will be cooled by forced convection. Fluctuations in the speed and/or temperature of the flow fluid create variations in the wire temperature and subsequently variations in its electrical resistance. These variations in the electrical resistance are used to make the measurements.

The electrical power released at the wire and subsequently exchanged between the wire and the surrounding environment may be provided in different ways by an electronic circuit, which can be used to define three types of anemometers:

the constant current anemometer,
the constant temperature anemometer,
the constant voltage anemometer.

Measurements made close to a surface are very special, because the surface influences the speed measurement due to its presence. This results in an overestimate of the speed value.

This overestimate is physically explained as follows. Since it is overheated, the wire is surrounded by a thermal diffusion spot. When the distance between the wire and the surface drops below the size of this hot spot surrounding the wire, an energy transfer occurs towards the surface. For the wire, this results in an increase in the transferred energy equivalent to an increase in the measured speed in comparison with a calibration made without the surface. This overspeed phenomenon is effective starting from a non-dimensional distance from the surface of the order of $y^+=6$. Different analytic corrections have been developed to correct measurements affected by this surface bridging phenomenon. These corrective methods all have the serious weakness that they were created (without exception) starting from the expected result. Consequently, they cannot be used for flow situations that are not in a steady state.

Schematically, a known probe described in the Ligrani and Bradshaw document, 1987, and illustrated in FIG. 1, comprises a metal wire 201 (hot wire diameter 0.625 μm) made of an alloy composed of platinum and 10% rhodium. This metal wire carries an electrical current in its active part 600 (heated length) and is "U" shaped.

This wire is fixed to the end of two tips 400, 600 kept in contact with each other by Araldite glue 450. It is fixed by (a tin) solder points 221 fixing the wire onto the tips.

The spacing e between the tips of the two pins is of the order of 0.5 mm.

As can be seen in FIG. 1, the wire defines a plane that is inclined at an angle α about 15° from the plane defined by the tips 400, 600, so as to neutralise the blocking effect generated by bringing the pins close together. The blocking effect disturbs the flow, due to the fact that the ends of the pins are too close. This disturbance affects all measurements made at the active part 600.

Therefore, one problem is to make a probe with better performances than such a probe. In particular, a probe of the type shown in FIG. 1 has problems with resistance to vibrations and sensitivity.

Another aspect of the envisaged measurement type is the filtering effect. This effect arises when the active zone is too large, providing an averaged or integrated measurement rather than a point measurement.

One solution to limit this filtering phenomenon consists of reducing the spacing between the pins in order to reduce the wire length. However, as mentioned above, bringing the pins too close together causes a blocking effect on the flow as explained by Comte-Bellot et al in the article entitled "On aerodynamic disturbances caused by single hot-wire probes", ASME, J. Applied Mechanics, vol. 38, 767-774, 1971). This solution that consists of reducing the active length of the wire based on the "Ligrani" probe concept, effectively increases the blocking effect caused by the pins being too close together.

There are no off-the-shelf probes such as those sold by the Dantec and TSI companies capable of solving the problems described above.

Therefore known probes, including off-the-shelf anemometric assemblies (typically 2.5 μm diameter probe associated with a constant temperature anemometer) are unsuitable for measuring turbulence on a small scale, and are absolutely unsuitable for measurements that we would like to make close to surfaces.

Furthermore, if we are to make increasingly accurate speed measurements and physical representations, we need multi-wire probes in which the volume delimited by all the wires is very small so that it can be assumed that all wires are within the smallest possible volume and therefore that the speed is the same for all the wires.

Finally, there are many technological problems with manufacturing a probe of this type, much of which have not been solved.

At the present time, it is impossible to make a probe composed of several wires separated by very small distances less than few fractions of a mm.

One particular problem that arises with the invention is to find a manufacturing method that can reproducibly produce a probe with excellent performances. In particular, such a method should make it possible to make single-wire probes or multi-wire probes, in "X" or with parallel wires.

PRESENTATION OF THE INVENTION

The invention is particularly useful for making a probe comprising very small diameter wires associated with a large spacing between pins, particularly so as to limit the blocking effect.

In particular, the invention can be used to reproducibly make probes using 0.35 to 0.625 μm diameter wires, for example 0.5 μm diameter wires.

Firstly, the invention relates to an anemometric probe with n wires (n≥1), placed in parallel or in X in order to make a measurement close to a surface, comprising the following for each wire:

a) two wire holding pins, the end of each pin comprising a wire positioning and fixing zone, b) a straight wire portion, soldered onto said wire positioning and fixing zones.

The ends of the pins may be separated by a distance equal to at least 4 mm.

Preferably, the wire comprises a central core made of a platinum and rhodium alloy with diameter d between 0.35 and 0.6 μm, and a silver sheath eliminated over a portion of the wire, called the sensitive or active zone, with a length of between 0.4 and 0.5 mm.

The wire may be soldered on the pins using a tin-lead type solder.

The wire is curved, to solve problems with breakage of the active part of the wire.

A probe according to the invention of the type described above may comprise n (n≥2) wires in parallel or in "X". For example it comprises 2 or 3 or 4 wires that may be parallel or arranged in "X".

The invention also relates to a method for making an anemometric probe with n wires (n≥1 or 2), particularly a probe like that defined above, in order to make a measurement close to a surface, comprising the following for at least one of the wires:

a) positioning and holding of a straight portion of the wire, comprising a metal core surrounded by a protective sheath on two surfaces, for example surfaces machined by polishing, b) then elimination of a part of the sheath to expose an active wire measurement zone, c) the wire is then soldered onto the two pins of the probe.

According to the invention, a previously exposed or stripped wire (step b), is mounted on the pins (step c).

The wire is positioned on a structure or surfaces (step a), so that the active part of the wire can be exposed or stripped locally (step b) before it is soldered onto the pins of the probe. With this technique, it then becomes possible to make probes with very complex configurations, with n wires arranged in parallel or in "X".

The surfaces on which the wire is supported have been aligned in advance, so as to provide a horizontal support for the wire and the most precise possible alignment of the wire.

The above steps may be repeated for each wire in a multi-wire probe.

Thus, the invention also relates to a method like that described above for making an anemometric probe with at least two wires, comprising the use of steps a)-c) for a first at least one of said wires and then the use of steps a)-c) for a second of said wires.

Step b) may comprise the following, for at least one of the wires:

positioning of a first part of the wire on the first of the two surfaces, and fixing this first part of the wire onto this first surface using a first drop of an attachment material, positioning of the second part of the wire on the second of the two surfaces and fixing this second part of the wire on this second surface using a second drop of an attachment material.

The wire may be held in place between these two positioning and attachment steps by means preventing bending of the wire relative to the first attachment point; such bending can occur during the second positioning and attachment step.

A method according to the invention may for example comprise formation of a wire curvature after step a) or b), for example by bringing the two surfaces towards each other.

According to one embodiment, step b) includes stripping of the wire sheath to form an active measurement zone, for example:

a first acid pickling step, then a second electrochemical stripping step.

A resistance measurement of the wire can be made so as to determine the stripped length. Stripping may also be done using a loop formed by a wire on which a drop of stripping liquid can be held.

One wire preparation method according to the invention includes an annealing step at a temperature significantly higher than the temperature at which the wire will be used.

Soldering may be done by a hot air gun or by laser impact.

Before step a), a preliminary wire straightening step can be used to make the straight part of the wire, for example by elongation, resulting from axial mechanical tensioning of the wire. For example, the wire is held fixed at the ends of two pads, one of which is free to move. This mobile pad may be connected to a micrometric displacement table along at least one direction, and preferably along 2 or 3 directions.

The invention also relates to a method for measuring anemometric magnitudes, particularly close to a surface, including the use of a probe according to the invention.

According to another aspect, the invention also relates to a device for regulation of a wire anemometer with constant current, comprising:

power supply means and means of regulating a power supply current to the wire and a reference resistance, means of determining a difference between a signal at the terminals of the probe wire and a signal at the terminals of the reference resistance, means of maintaining a constant temperature of the device.

This regulation device may be applied to a probe according to the invention described above or to another type of anemometric probe. But particularly useful results are obtained with a probe according to the invention.

For example, the wire and the reference resistance may be mounted in current mirror.

The means of regulating a power supply current preferably comprise a regulation transistor mounted in diode and a potentiometer.

The invention also relates to a cold wire thermo-anemometer comprising:

an anemometer, for example with the structure described above within the scope of the invention, and a regulation device like that described above.

The invention also concerns a method for measuring a temperature in a flowing fluid, including the use of a thermo-anemometer like that described above, without an additional thermocouple.

DETAILED PRESENTATION OF EMBODIMENTS OF THE INVENTION

Figure 1:
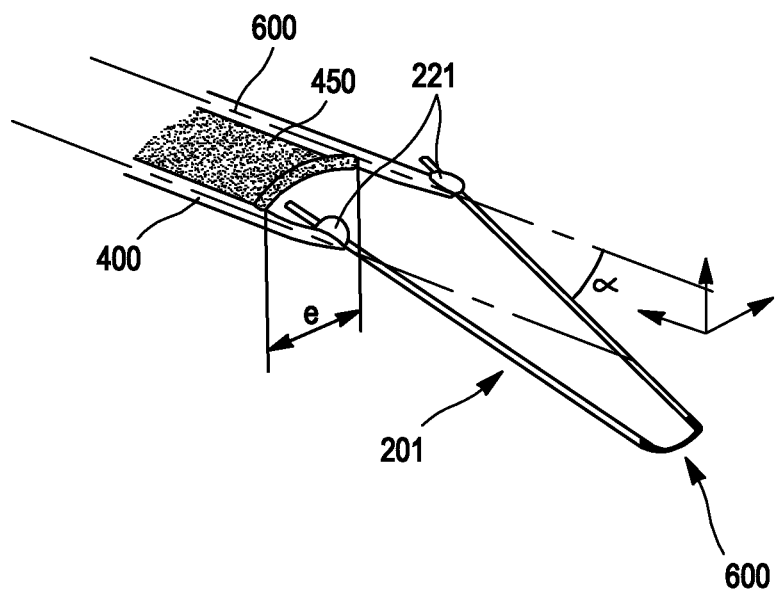
FIG. 1 shows a known type of hot-wire probe.

FIGS. 2A-2E and 14 show an example of a probe according to the invention.

This is one particular configuration, many other configurations are possible.

According to this example, the probe comprises a wire 2 tensioned between the sharpened ends of two metal pins 4, 6, which extend into a cylindrical shaped insulating body 10, preferably made of ceramic.

It also comprises a tensioned wire 20 between the sharpened ends of the two metal pins 40, 60, which also extend into the insulating body 10.

Figure 14:
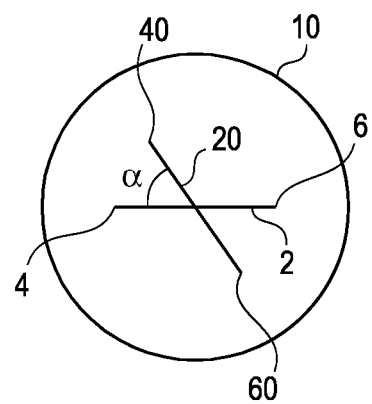

The two wires 2, 20 are arranged with an angle α between them (see FIG. 14 that shows a front view of the device) even if they are located in two distinct planes parallel to each other and perpendicular to an axis of the device, identified by the axis of the insulating body 10. These parallel planes that contain them are separated by a distance less than or equal to 0.8 mm, or between 0.2 and 1 mm or between 0.3 and 0.8 mm. The angle α may be 90°, therefore the two wires may be perpendicular to each other as seen in the front view shown in FIG. 14. These structures are qualified as "X" structures due to the relative position of the wires as shown in FIG. 14.

Figure 3A:
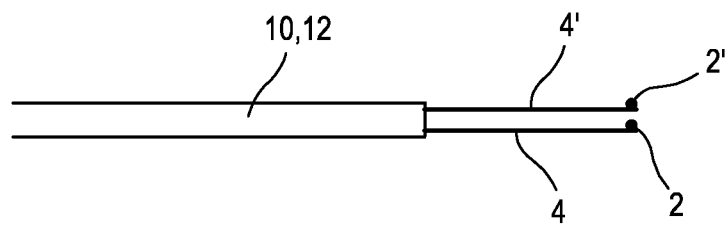
FIGS. 3A-3B show other types of probes according to the invention, with two or more than two wires.
Figure 3B:
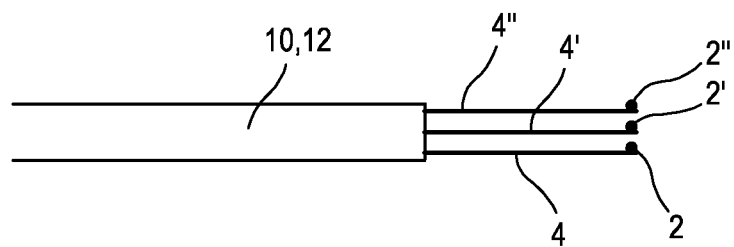

But the invention also relates to and makes it possible to make devices with parallel wires like those shown in FIGS. 3A and 3B. Once again, the wires are separated by a distance δ less than or equal to 0.8 mm, or between 0.2 and 1 mm or between 0.3 and 0.8 mm.

More generally, this maximum difference between the planes in which the wires are located, or this maximum difference between the wires contributes to the possibility of making point measurements to obtain an extremely fine representation of the observed phenomena.

Figure 15B:
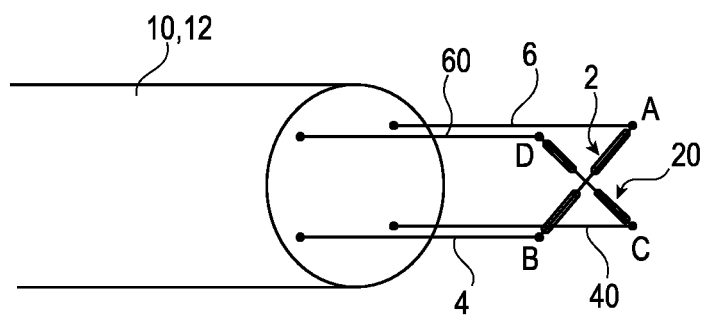
FIGS. 15A and 15B show another configuration of a probe with wires in "X" according to the invention.
Figure 15A:
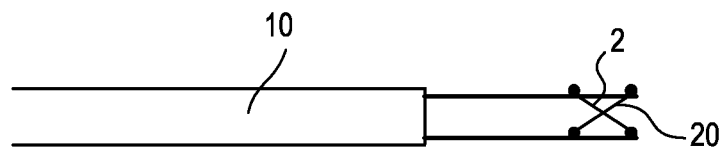

FIGS. 15A and 15B show another X configuration. This configuration also comprises two wires 2, 20, each with a central detection zone like that shown in FIG. 2E described below. Each wire is held in place by two pins 4, 6, 40, 60, arranged in the probe body as described above. This figure shows that in this case the "X" shape can be seen when the probe is viewed from the side. Many other "X" configurations are possible. The actual configuration depends on the environment and the conditions under which the measurement has to be made.

Figure 2A:
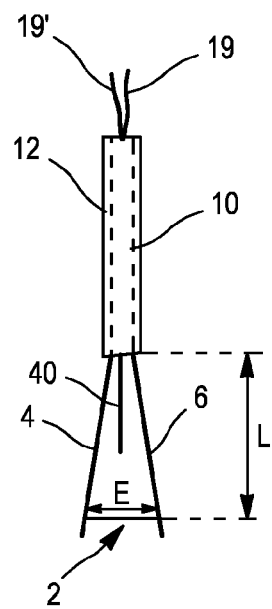
FIGS. 2A-2E and 14 show aspects of a probe with wires in "X" according to the invention.
Figure 2B:
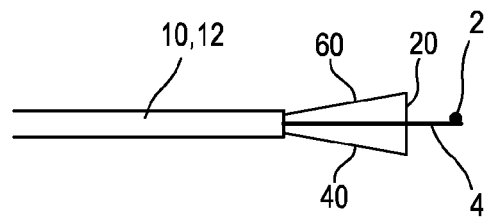

Regardless of the embodiment, the probe body 10 may for example be composed of a ceramic cylinder with a diameter that may be between 2 and 4 mm, in which stainless steel needles with a diameter between 0.2 mm and 0.4 mm for example, are installed to act as pins 4, 6, 40, 60 (case in FIGS. 2A and 2B, but this is also applicable to other cases like those shown in FIGS. 3A, 3B).

Figure 2C:
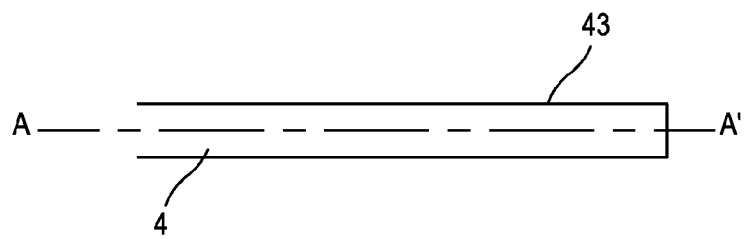

The wire 2 (and possibly another wire or any other wire used in a probe prepared according to the invention) is placed on pins 4, 6. FIG. 2C shows a side view of one example of the shape of these pins, pin 4. Reference 43 denotes the part of the pin 4 on which an end of the wire 2 will be soldered. The other pin 6 has the same structure. Therefore, each pin has an approximately cylindrical section along the AA' direction, for example the AA' axis is an axis of symmetry of revolution of the pin if the pin has a cylindrical shape (FIG. 2C).

The wire 2 also has an extremely precise alignment of the order of one hundredth of a mm. Unlike the known probe structure (as explained above with reference to FIG. 1), a straight portion of wire 2 is placed on the pins 4, 6. There is no need to bend the wire in the shape of a "U" like the case in FIG. 1, since such a curvature reduces the precision and reproducibility of the device.

A tin-lead alloy type solder may be used to solder the wire 2 onto the pins 4, 6.

The projecting length L of the pins will depend on the configuration, but it may be of the order of approximately 15 mm. For the structure in "X" in FIGS. 2A and 2B, this length is less for wires behind the wire closest to the front of the probe, in other words for wire 20 in FIG. 2B, than for wire 2.

The distance D that separates the ends of two pins intended to carry a single wire, may be equal to or more than approximately 5 mm, and preferably between 5 and 8 mm, for boundary layer flow rates of less than or slightly more than 12 m/s. On the other hand, for high shear situations, for example at a jet boundary, good behaviour is only obtained when the spacing between the pins does not exceed 4 mm. If the spacing is more than 4 mm, the shear excitation can induce amplitude oscillations that are large at the scale of the wire due to insufficient stiffness of the silver sheath of the wire 2 (the structure of which is described below), and can break the wire. In order to reduce the risks of breakage of the active part of the wire during manipulations, the probe body is sheathed by an elastomer tube 12 that will absorb waves or vibrations that could propagate to the wire 2, the active part of which is very fragile.

Figure 2D:
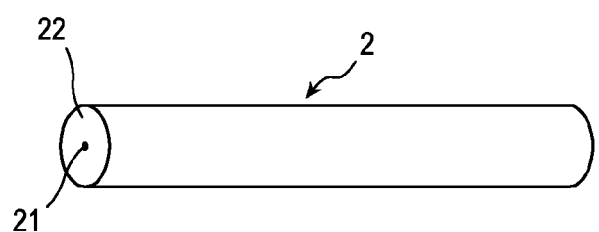

The wire 2 (or 20; or another wire or any other wire used in a probe made according to the invention) is preferably a wire with a central part 21 made of platinum or a platinum-rhodium alloy, surrounded by a silver sheath 22 that may have a diameter of between 50 and 80 μm as shown in FIG. 2D.

The diameter of the central part 21 is very small, less than 0.635 μm or 0.6 μm, for example 0.35 μm or 0.5 μm. The wire used is preferably a "Wollaston type wire" composed of a platinum-rhodium (Pt-10% Rh) alloy. It is impossible to manipulate a wire of this diameter directly with no risk. This manipulation is possible due to the 30 to 50 μm diameter silver sheath surrounding the wire (FIG. 2D).

Figure 2E:
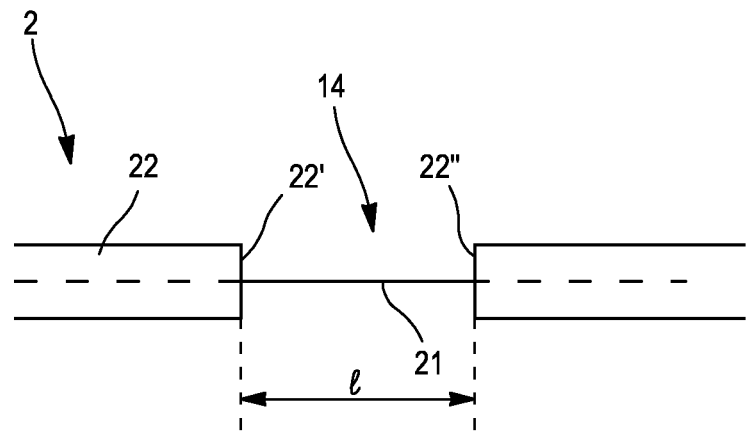

Such a wire gives better point measurements than is possible with known devices because a measurement zone 14 can be delimited by stripping the wire sheath locally as shown in FIG. 2E. The result is an active length l between 0.4 and 0.5 mm. A shorter active length would make the measurement less accurate because edge effects due to the ends 22', 22" of the sheath at the limits of the measurement zone 14 would then be too high. This aspect is shown in FIG. 2E, in which the active part 14 and the silver sheath 22 can be clearly seen.

The active part 14 is not visible in FIG. 2A, because the width of this active part (between 0.4 mm and 0.5 mm) is small compared with the spacing E between the ends of the pins 4, 6 (at least 5 mm).

The l/d ratio of the active length of the wire to its diameter is between approximately 600 and 1500. The concentrated nature of the measurement disappears with higher values: filtered or averaged measurement effects already mentioned then arise. The two-dimensionality assumption, therefore a very flat temperature profile in the active zone, is satisfied if the ratio is between 600 and 1500 ($600 \leq l/d \leq 1500$). End effects appear if the ratio is less than 600, such that the temperature profile along the wire can no longer be considered as a "gate" profile (in other words a constant temperature along the wire), this profile is then more like a parabolic type profile. Specifically, this situation results in a loss of sensitivity of the wire and a deterioration of the signal-to-noise ratio. Physically, this means that it is impossible to capture small amplitude phenomena.

The wire 2 is connected to the pins 4, 6 by soldering the silver sheath 22 on these pins.

A probe according to the invention has measurement positioning properties, without any filtering effect (due to the point measurement effect achieved by the very small width of the measurement zone 14), without any blocking effect (due to the distance between the ends of the pins). This probe also resists vibrations. Therefore, a probe according to the invention can measure physical amplitudes as close as possible to a surface, without bias and therefore without it being necessary to make a correction. For a single wire probe and a speed range of less than 10 m/s, it is possible to approach up to $y^+ \approx 2$ without any correction for the surface. $y^+$ is defined as being the product of the friction speed by the distance from the surface divided by the kinematic viscosity.

The invention relates equally to a single wire probe and to a parallel multi-wire probe like that shown in FIGS. 3A and 3B.

Another purpose of this invention is a double probe, for example a probe that associates a parallel hot wire 2 and cold wire 2' at a spacing of the order of 0.3 mm (or more generally between 0.2 and 1 mm) between the two wires, as shown in a side view in FIG. 3A (the wires are only seen from the side, therefore each wire 2, 2' appears as a point in this figure and in FIG. 3B). The other references are the same as in FIGS. 2A-2E and denote the same elements. There are two pairs of pins in this embodiment, pair 4, 6 already described above on which the wire 2 is soldered, and another pair 4', 6' (of which only the pin 4' can be seen in FIG. 3A) on which wire 2' is soldered.

FIG. 3B shows a side view of a triple probe that uses three parallel wires 2, 2', 2". Once again, the references are the same as those shown in FIGS. 2A-2E and denote the same elements, the maximum distance between the wires being between 0.2 and 1 mm, preferably between 0.3 and 0.8 mm. In this embodiment, there are three pairs of pins, pair 4, 6 already described above on which wire 2 is soldered, and another pair 4', 6' (of which only pin 4' can be seen in FIG. 3B) on which the wire 2' is soldered, a third pair 4", 6" (of which only pin 4" can be seen in FIG. 3B) on which the wire 2" is soldered. Such a triple probe preferably operates with a hot wire at the centre (wire 2') and two cold wires on each side (wires 2 and 2"), that provide information about the flow direction.

In a double probe, or more generally a probe with n wires, at least one of the wires or each of the wires has the characteristics described above and is fixed to a pair of pins as described above.

Speed and temperature measurements have been made with a 5-wire probe made according to the invention, in which each wire has a stripped zone such that the l/d ratio is between 600 and 1500. This probe is composed of two pairs of wires, each pair being arranged in "X", and contained in a plane perpendicular to the plane of the other pair, and an additional wire (cold) for the temperature measurement. This configuration enables simultaneous measurement of the three components of the speed in a non-isothermal flow. The volume delimited by the two pairs of wires is about $0.4^3$ mm$^3$, while the l/d ratio of each of the wires is about 1000.

We will now describe a method for manufacturing a probe according to the invention. It relates to the manufacture of a single-wire probe and can be applied to manufacturing of a probe with an arbitrary number of wires, unless specified otherwise.

All operations are preferably made under a binocular magnifying glass, considering the size of the elements and the required precision. This magnifying glass or any other chosen or equivalent form of display, can display with a precision of $\frac{1}{100}^{th}$ mm.

Firstly, the pins 4, 6, 40, 60 are fixed to the probe body 10, 12. Drillings have been made or grooves have been formed in the probe body, so that these pins can be put into position. The pins may be inserted in the probe body using a template so that they project from the probe body by an equal length.

The welded connection between the electrical power supply cables 19, 19' (FIG. 2A) (these connection means are used to input the current to be carried by wire 2) and pins 4, 6 may be located in the groove or the drillings of the body 10 or outside. This connection is soldered during this preparation step. These connections and cables, or other connections and cables, can be used for the other pins.

The pins can be sealed in the support by coating them with a concrete that is compatible with the ceramic after setting. Tests show that a glue, for example an Araldite glue, can perform this sealing function perfectly well while maintaining some elasticity that can be very useful in absorbing vibrations and protecting the probe.

The probe body 10, once fitted with its pins 4, 6, 40, 60 is inserted into an elastomer shock absorbing sheath 12 to eliminate vibrations that could break the very thin active part of the wire 20.

The pins 4, 6 are cleaned to achieve optimum wettability so that the wire can be soldered later. The ends of the pins are tinned using a soldering paste (reference Castolin 157A) deposited on a stainless steel sheet using a soldering iron, to remove the different oxides and create a support on which the solder can bond. The pins are then cleaned with acetone.

Figure 4:
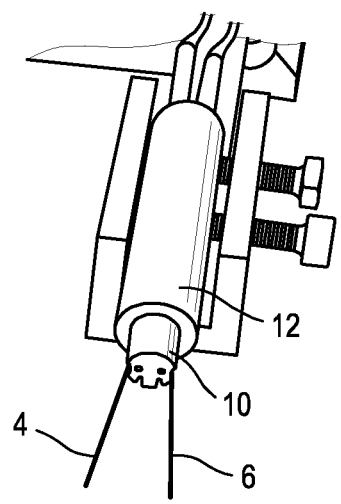
FIGS. 4-10 show steps for making a probe according to the invention.

FIG. 4 shows the probe body 10, 12 with its pins 4, 6 ready to receive the probe wire 2. The body of the probe is installed on a set of micrometric tables not shown in the figure, so that extremely precise displacements along two or three dimensions can be made to the nearest hundredth of a millimeter.

The wire 2 itself is usually made starting from a wire wound in the form of a coil.

Therefore a first operation is a wire straightening operation in order to erase the wire's memory of being wound on the coil. For a wire with a central core diameter less than 0.5 μm, for example 0.35 μm, there is a risk that the central core of the wire might break during the wire straightening phase by rolling on a working surface.

Figure 5:
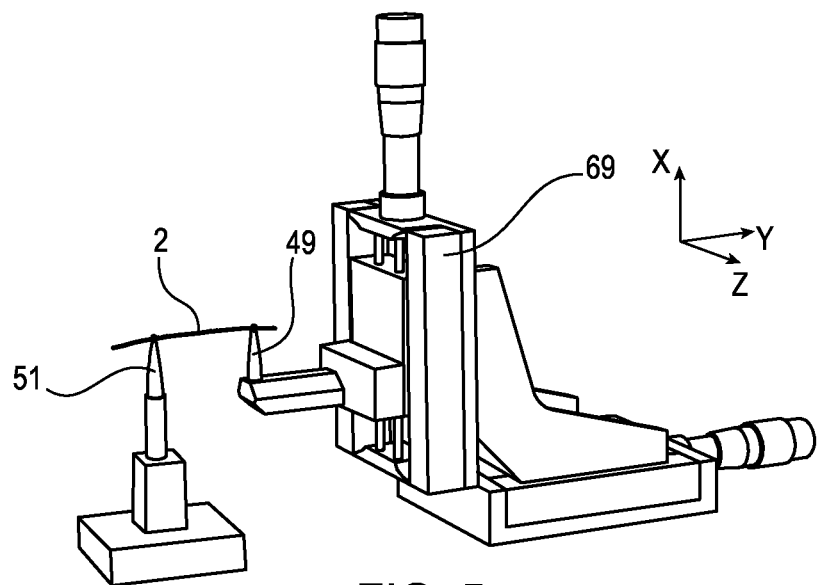

An appropriate straightening step uses an elongation that is caused by mechanical axial tension on the wire. In practice, the two ends of the wire are soldered on a system fitted with two pads 49, 51, one of which (the pad 49) is free to move due because it is mounted on the plate of a micrometric table 69 with 2 dimensional X, Y displacements as shown in FIG. 5. This table is capable of making extremely precise displacements to the nearest hundredth of a millimeter along each of the two dimensions.

It is preferable if the two tips of pads 49, 51 are in the same horizontal plane initially, so that the straightening operation can be optimised.

The mechanical tension used to straighten the wire has not been precisely quantified. However, the following method can be used.

Displacements of the mobile pad 49 are measured using the micrometric table. The origin of the displacements is taken when the wire tension starts to bend a needle (for example 50 mm long and 0.2 mm diameter) that is bearing on the wire and is held by an operator (remember that the operations are carried under an observation at high magnification, for example using a binocular magnifying glass). Experience shows that a 0.4 mm displacement of the mobile pad 49 is sufficient to obtain good straightness and increased stiffness of the wire.

After the wire has been unsoldered from pads 49, 51, the two ends of the wire 2 are cut for the remainder of the operations so as to keep only the straightened part of the wire. This operation is done with a razor blade.

The wire placement will now be described with reference to FIGS. 6 to 8.

Figure 7:
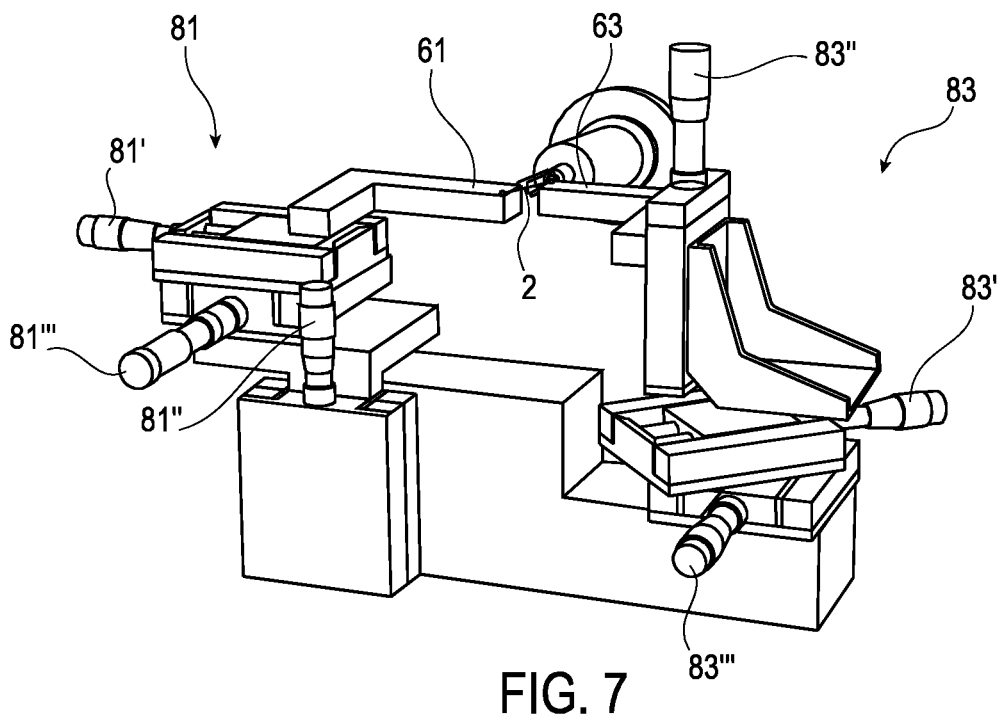
Figure 8:
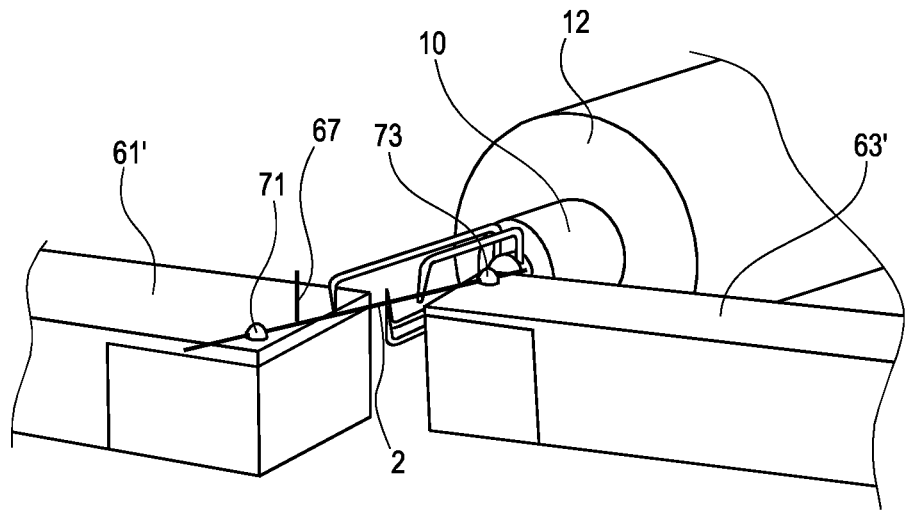

FIG. 7 globally shows the entire system with two assemblies 81, 83 each comprising three micrometric tables 81' (for a displacement along X), 81" (for a displacement along Y), 81'" (for a displacement along Z) and 83' (for a displacement along X), 83" (for a displacement along Y), 83'" (for a displacement along Z). Each table will be capable of making an extremely precise displacement, to the nearest one hundredth of a millimeter.

Figure 6:
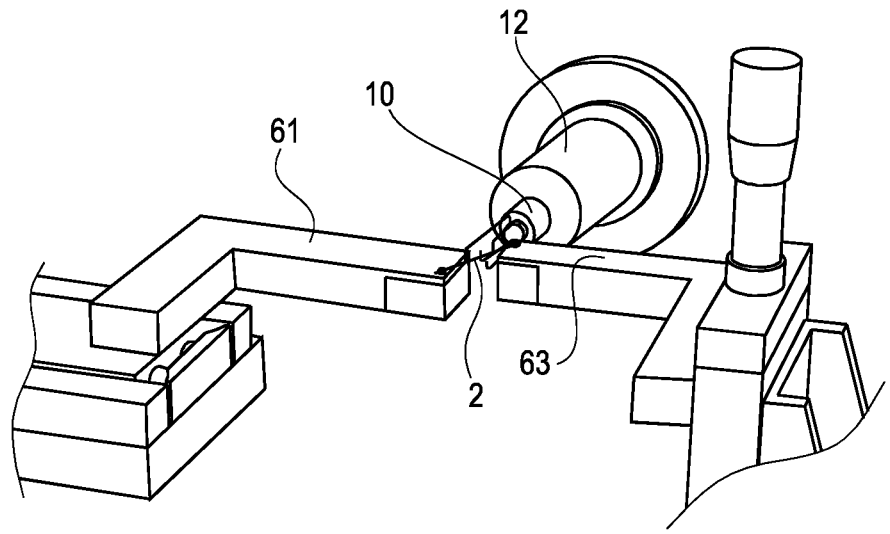
Figure 9:
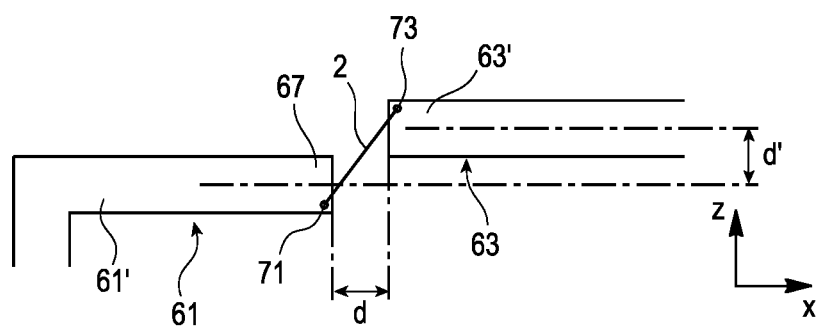

An L-shaped beam 61, 63 will be fixed to each of these two assemblies 81, 83 (see also FIGS. 6 and 7). The largest part of the "L" of the beam 61 is arranged approximately along the same direction as the largest part of the "L" of the beam 63 (see FIG. 9 that shows a top view of the two beams), in fact along a direction at approximately 45° from each of the axes X and Z in FIG. 8. FIG. 9 shows the position of the two beams 61, 63 in a top view.

Each of the ends of the wire 2 will be placed on this system which comprises these two beams 61, 63. More particularly, each end of the wire 2 is placed in contact with a surface of the corresponding beam, that is machined by polishing.

The offset distances d, d' (FIG. 9) between the perpendicular axes X and Z, between the ends of the two beams (for a probe in "X"), are dependent particularly on the spacing between the pins 4, 6 of the probe onto which the wire is to be fixed.

These two beams 61, 63 are initially placed in the same horizontal plane.

The following procedure can be used to check that the two beams are in the same horizontal plane.

A previously straightened wire is straddled on the two beams. The two beams are considered to be at the same elevation when the wire is uniformly in contact on the face 61', 63', of each beam. The "Y" displacement (vertical axis) of the micrometric tables is varied to obtain this condition.

The probe wire is then fixed on each beam using a drop 71, 73 of a glue or cement type material, for example refractory cement (made by Degussa) as shown in FIG. 7.

The operation is fairly delicate in that creating contact between the wire and each drop causes a small displacement of the wire due to surface tension phenomena. This displacement phenomenon is a problem when the second cement drop is deposited, because it causes bending of the wire relative to the first fixing point held by the first drop that has already been deposited. This bending is sufficient to cause the central core of the wire to break during the final wire stripping phase. Therefore, this displacement phenomenon is neutralised by blocking the wire 2 using a tip 67 placed at the end of the beam 61 on which the first drop 71 is deposited.

A small solder dab can then be deposited at each location of the future junction between the wire 2 and each holding pin, using the end of a needle. This solder is preferably composed of 15 μm diameter microballs made of different elements (Sn 62%; Pb 36%; Ag 2%) combined to obtain a low melting point.

When the wire placement operation has been terminated, the central part 14 of the wire that will be used for the measurement can be stripped (active part 14, FIG. 2E).

Stripping is done by local dissolution of the silver sheath 22 by chemical or electrochemical etching.

This sheath is etched with nitric acid. This can be done using two techniques, namely the jet and drop techniques. With the jet technique, a millimetric acid jet is sprayed onto the wire while with the drop technique, an acid drop is formed and slowly brought into contact with the wire. The jet technique has been abandoned because it stresses the wire, and contact with a static drop is more suitable for the low mechanical strength of a small diameter wire.

The length l to be stripped is determined as a function of the wire diameter d, knowing that if it is required to make the most uniform possible temperature profile on the wire when it is used as a hot wire, an l/d ratio of more of 250 can limit the impact of conduction at the ends of the active part on the measurement (for a given material and therefore a given cold length). The wire resistance can be measured to obtain an indication of the stripped length using the following relation:

$$R = \frac{\rho l}{S}$$

where ρ is the electrical resistivity of the material, in this case platinum–rhodium ($\rho=1.9\times10^{-7}$ Ω·m). Therefore, this resistance is measured during stripping.

The result obtained for 0.35 and 0.5 μm wires and a stripped length l between 0.4 and 0.5 mm is approximately:
For a diameter of 0.35 μm: 1150<l/d<1400
For a diameter of 0.5 μm: 800<l/d<1000

Figure 10:
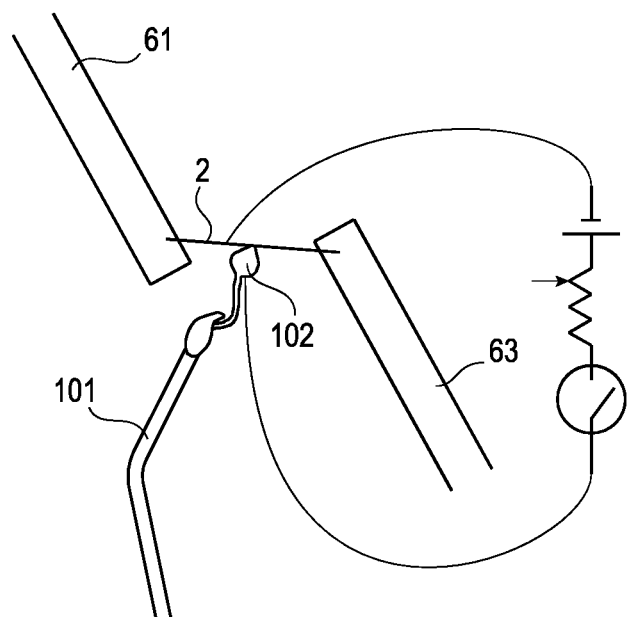

The system described herein for stripping may be composed of a stainless steel wire 101 a few hundredths of a millimeter. This wire 101 is shown in FIG. 10, close to the wire 2 to be stripped, itself in position between the two beams 61, 63.

The end of this wire 101 forms a loop that holds the drop 102 in position. This drop composed of pure nitric acid is deposited on the loop using a syringe. The loop and the drop are then moved using micro-manipulators to bring the drop into contact with the wire 2 to be stripped.

A to and fro movement is made using the micro-displacement tables to dissolve the silver of the sheath 22. Once the drop is saturated in silver, the drop is removed from the wire and replaced by another drop of nitric acid. The procedure is continued until the platinum-rhodium wire 21 is exposed and the resistance of this wire starts to change. The stripped length is adjusted as a function of the resistance of the probe. Typically, the wire resistance is 500Ω for a 0.5 μm diameter wire and 1 kΩ for a 0.35 μm wire, which corresponds to a stripped length of 5 to 6 tenths of a millimeter corresponding to l/d ratios of the order of 1100 and 1600 respectively. According to the invention, a 0.5 μm wire is used to give an l/d ratio of 1100. As explained above, a probe with an l/d ratio of more than 1500 cannot make sufficiently local measurements; the result is then filtering or measurement averaging effects as mentioned above.

Once stripping with pure acid has been done, a second electrochemical stripping is done so as to remove all traces of residual silver from the exposed wire. If any silver remains on the wire, it will migrate to the platinum-rhodium grain boundary and change its resistance value. It will then be impossible to readjust to the original calibration and make correct measurements.

Therefore, a simple electrical circuit composed of a battery, a potentiometer and a switch is connected to the metal loop that carries the drop and to the wire 2 (as shown in FIG.

10). The next step is to form a drop 102 for stripping as before, but this time composed of 5% dilute nitric acid. The drop is brought closer in the same way as for the previous drops to wet the wire inside the drop. The switch is then activated for a short time because degassing occurs very quickly and violently on the scale of the wire. The wire is rinsed using a drop of demineralised water after this operation to eliminate all residual traces of acid on the wire.

The previous method is used by forming a drop with a size that is constrained by the size of the loop and surface tension forces.

After stripping the wire, and in order to prevent the wire from breaking at the stripped part, a slight curvature is made by moving one of the two beams 61, 63 closer by 1 to 2 hundredths of a mm along "X".

A wire tensioned between 2 points (and particularly between the two pins 4, 6 when the wire is fixed on these two pins) is very sensitive to the smallest vibrations and can break very easily, and this is particularly true when the diameter of the wire 2 used is small. Many attempts have shown that a tight wire probe can be damaged even when strict assembly precautions are taken.

Therefore, a slight curvature as described above is applied to the wire 2 at the time of the manufacturing, to increase the mechanical strength of the probes.

The wire 2 then has a slight curvature or deflection of the order of a few hundredths of a mm, for example less than $2/100^{th}$ or $4/100^{th}$ mm, for example in a plane approximately perpendicular to the axis of the body 10 of the probe. This curvature will have no influence on anemometric measurements made afterwards and makes the wire more flexible so that it can absorb mechanical stresses or vibrations.

When all these operations have been done, the wire can be soldered onto the pins 4, 6, 40, 60 of the probe. These pins are then brought close to the wire (see the position of the body 10, 12 of the probe in FIGS. 6 and 7; the micrometric tables on which it is mounted are not shown). Fine positioning is made using the sets of tables 81, 83. The body of the probe itself is also fixed to a set of tables similar to one of the assemblies 81, 83. The probe body is brought closer such that its axis passes approximately through a horizontal plane in which the wire lies.

Once this operation has been done, the wire 2 and a first pin (for example pin 40) are degreased with acetone.

The next step is to melt the solder, for example using a hot air iron. At this stage the wire 2 is fixed to the pin 4, and the next step will be to solder it onto its second pin 6. The curvature applied to the wire as described makes it possible to do this operation with no risk of breakage.

When soldering has been done, the wire 2 adopts and keeps a slight curvature or deflection of the order of a few hundredths of a mm, for example less than $2/100^{th}$ or $4/100^{th}$ mm.

The wire 2 is then cut flush with the pins using a razor blade, so that the wire support assembly can be removed and remaining wire ends on the wire support assembly can be desoldered.

It may be difficult to manufacture probes with several wires using this soldering technique. The distance between the two wires is never sufficient to prevent any interaction of the jet from the hot air iron with a first soldered wire when soldering a second wire. One solution to this problem is to install a thermal screen in the space between the two pairs of pins, to protect the first wire.

Another technique uses very local power applied by a laser beam, the concentration of which has the advantage that it does not thermally pollute the environment. The laser used is pulse mode Yag type with a maximum power of 30 W. The pulse frequency and duration are adjustable. The beam is focused on the soldering point at the end of the pin using a camera coupled to the laser, and the laser is fired to melt the solder and fix the wire to the pin. With this technique, the soldering operation can be done regardless of the degree of miniaturisation of the probe and the number of wires contained in it.

A final annealing of the probe can then be done; a current calculated as a function of the probe resistance is passed through the wire 2. The wire is thus heated to a temperature significantly higher than the temperature at which it will operate. The temperature difference between the wire and ambient air is given by the following relation:

$$\Delta T = \frac{R_{fil} - R_o}{aR_0}$$

where $R_0$ is the resistance of the probe at ambient temperature, $\alpha$ is the coefficient of variation of the resistance with temperature ($1.6 \times 10^{-3}$ K$^{-1}$ for Pt-10% Rh) and where $R_{wire}$ is the resistance of the wire heated to temperature T+$\Delta$T, given by Ohm's law.

This operation diffuses any final traces of silver into the crystalline structure of the platinum-rhodium wire. If stripping has been done correctly, the quantity of residual silver will be very small, the wire stabilises after one day and its resistance will no longer change.

Depending on the probe configuration, it may be advantageous to install one wire before the next when there are several wires.

Experience shows that manipulation of probes becomes very difficult as soon as the wire diameter drops below 0.625 μm. In particular, when a probe according to the invention is mounted in a wind tunnel, vibrations are created that are critical for the resistance of the sensor because they are strong enough to create a wave that propagates in the pins as far as the wire. Due its low mechanical strength, the presence of a curvature in the active part is not always sufficient to dampen these vibrations that can cause breakage of the wire. It has been observed that most vibrations are transmitted to the end of the pin through the probe body, for example when it is fixed on its support by a screw.

The best solution for protecting the wire consists of inserting the ceramic probe body once its pins have been fitted on it, in a very soft shock absorbing sheath 12 (of the order of 25 Shore A).

A probe according to the invention is used with power supply means, and means of measuring variations of the electrical resistance of the wire(s). These are the variations that represent speed and/or temperature variations in a fluid transported in a flow in which the probe is immersed.

In general, it is preferable to use a battery power supply to make precise and reproducible measurements. Thus, the system is decoupled from the electrical network on which potentials can fluctuate (for example due to starting or stopping of nearby installations). Moreover, the currents and/or voltages involved at the sensor are very low and can easily be disturbed by these network fluctuations, no matter how small they are.

Furthermore, it is difficult to correctly put all the different ground points to the same potential in installations such as a wind tunnel. The result is loop currents between these different ground points created by fluctuations in the network voltage, and these currents can also significantly disturb the measurements.

With this solution, power can be applied to all circuits that thus have a fixed ground potential that no longer fluctuates, as can be the case when they are connected to electronic voltage regulators.

Circuits are preferably placed in a housing, for example a copper housing, that forms a ground plane connected to the battery ground, to achieve electromagnetic compatibility (EMC). A braid surrounding the probe connection wires is also connected to this ground plane. Thus, all such protections against electromagnetic fields are connected to a fixed potential.

The solutions described above firstly to obtain an undisturbed power supply and secondly for electromagnetic compatibility are applicable to all types of operations of the anemometer.

One particular operation is so-called "cold wire" operation. This is a constant current operating mode in which the current input into the wire is very low.

Cold wire anemometers are already known.

In these known devices, the power supply includes a large resistance R placed in series with the wire so as to keep a constant current intensity Iw in this wire when the flow speed varies. The wire is built into a Wheatstone bridge in order to precisely measure its resistance Rw; the output signal is collected at the vertex of the bridge.

The constant current anemometer has advantages. Any method can be used to increase its temperature (superheating), which is very useful when studying temperature variations. The background noise can also be measured by substituting a fixed resistance for the wire and then making necessary corrections to the measurements. On the other hand, output signals are strongly amplified. The passband of this measurement principle is imposed by the thermal inertia of the wire.

With this type of operation, the current that supplies power to the wire is reduced to almost zero, to minimise the wire temperature rise. The wire is then no longer cooled by convection (insofar as it is not heated) and becomes sensitive only to the temperature of the surrounding medium T through the value of its resistance $R_{wire}$ according to the following relation:

$$R_{wire}=R_0[1+a(T-T_0)]$$

where R0 is the resistance of the probe at a reference temperature and a is the coefficient of variation of the resistance with temperature.

The temperature difference with this type of operation is small and the current input into the wire is very low. It is used simply to measure a voltage at the terminals of the wire to determine the value of its resistance. It is usually of the order of 50 to 200 μA. Thus, heating of the wire by the Joule effect is negligible which is why this anemometer is called a cold wire anemometer.

One problem that arises with this type of operation is that the measured temperature drifts, therefore the probe has to be used with a thermocouple to obtain an average temperature measurement.

The invention proposes a solution to this problem.

Figure 11:
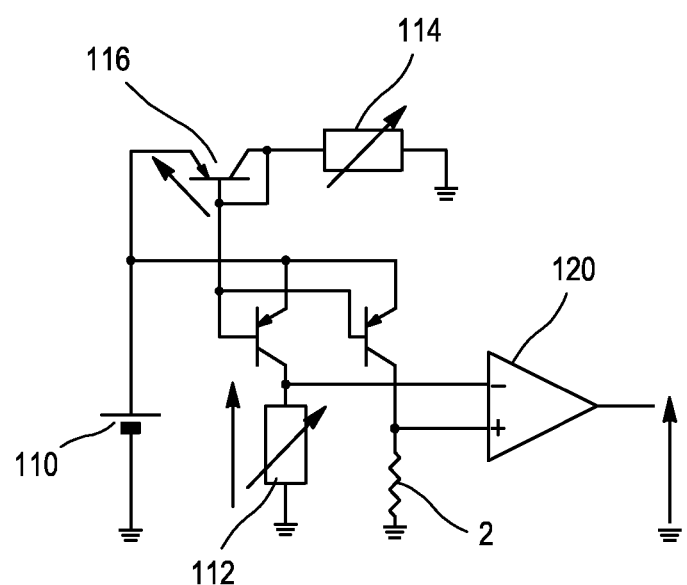
FIG. 11 shows a power supply and measurement circuit that can be used within the scope of this invention.

FIG. 11 shows electronic means associated with a constant current anemometer, in which the wire is still denoted as reference 2. The circuit shown also comprises:

power supply means 110, preferably a battery as explained above, a reference resistance 112, a potentiometer 114 for adjustment of the current.

More precisely, the circuit power supply Ve represented by the battery 110 is powered through a voltage regulator (MAX 6325). The two resistances 2, 112 are installed in current mirror. The current passing through the two branches of the mirror, each of the branches containing one of these two resistances, is adjusted through the voltage Vbe of an adjustment transistor 116 mounted as a diode, through potentiometer 114. The potential difference between the probe 2 and the reference resistance 112 is applied to an instrumentation operational amplifier 120. The output from the amplification provides a measured signal that gives the variations in the resistance of the wire 2.

The signal is amplified at the terminals of the probe 2 so that low amplitude information can be interpreted. This amplification is preferably not very high, to take account of voltage limitations of acquisition cards (an attempt is made to take account of the voltage resolution of the acquisition card). An anemometric probe 2 has a high resistance and, after amplification, anemometer output variations can exceed the usage range of the cards. This is why it is decided to centre the thermometer output signal around zero; this also enables maximum benefit of the measurement range and the gain can thus be adjusted accordingly. This is done by subtracting the value of the signal at the terminals of the probe 2 from the signal at the terminals of a reference resistance 112.

The current mirror circuit provides a stable signal passing through the reference resistance, and a stable current passing through the probe 2.

Such a device was used for test campaigns in a wind tunnel, the probe being a single-wire probe operating in cold wire.

An abnormal drift in average temperature measurements was then observed that was inconsistent with the measurement conditions and the platinum reference probe 112 used in the installation. It was found that the only possible source of this drift was the electronic circuit. The components are sensitive to the temperature of the surrounding environment, and a difference in the ambient temperature in the calibration room and in the wind tunnel could easily explain the observed differences.

Firstly, the reference resistance 112 was replaced by a metal resistance for which the coefficient of variation with temperature is much lower (0.6 ppm/° C.) and is negligible.

Records of the different voltages involved were made by putting the electronic circuit into a drying oven with a monitored temperature. It can thus be verified that the output voltage from the electronic voltage regulator does not vary with temperature (drift 5 μV° C.$^{-1}$). There was a perfectly coordinated drift of the order of 250 μV° C.$^{-1}$ in the two voltages at the terminals of the reference resistance and at the terminals of a second resistance provided to simulate the probe (for resistances of 670Ω). Therefore, this indicates that the current varied simultaneously and identically in the two branches of the current mirror.

The next step was to consider the value of the voltage Vbe that fixes this current. A record made under the same conditions indicated a drift of this voltage equal to 2.4 mV° C.$^{-1}$. This drift is due to the fact that the transistor 116 concerned by this voltage is installed in diode; the voltage drift usually observed at the terminals of a diode is approximately 2.5 mV° C.$^{-1}$, which is perfectly consistent with our records.

The thermometer components (the probe and its power supply and measurement means) are kept at a constant temperature to prevent this drift. For example, the power of a heating mat placed in the anemometer housing is regulated electronically.

The electronic circuit of the thermometer is thus kept at a temperature higher than the temperature of the room in which it is located. This temperature at which the circuit is kept is regulated to plus or minus one tenth of a degree. Thus, the components that form the anemometer not only remain stable, they also operate within reproducible conditions.

Once a single calibration of the anemometric system has been made, this device can be used to measure temperature fluctuations in the flow, but also its average temperature which has not been possible in the past. Even in the case of known devices for which special care is taken for metrology and for measurements (this is the case particularly for temperature measurements at the output from a jet, reported by Andreopoulos in "experimental investigation of jets in a cross flow, Journal of Fluid Mechanics, 1983), temperature fluctuations are measured by a cold wire while the average value is given by another means like a thermistance or a thermocouple.

The circuit described in this part is applicable to a probe with several wires. As many circuits as are necessary may be made.

An example of calibration and use will now be described.

Calibrations are made in a wind tunnel. Air passes firstly into a heating box and then a water exchanger, the power and flow of which can be controlled independently to obtain the required temperatures between the ambient temperature and about 150° C.

The cold wire probe 2 is placed in the calibration stream (surrounded by a thermal guard ring) at the centre of the output from an air injection nozzle. The containment temperature is given with a precision of one tenth of a degree by a Pt100 reference probe associated with an electronic measurement box (reference Sfere DGN75T).

An operating point of the heating box and the exchanger is chosen for each calibration point. The next step is to allow a thermal equilibrium to be set up between the air and the walls of the wind tunnel, which takes several hours (typically 4 hours). The next step is to read the voltage output by the thermometer for about thirty seconds, which is quite sufficient to obtain convergence of the measurement.

The operation is repeated five times to obtain coefficients for calibration of the linear dependence of the thermometer output voltage as a function of the fluid temperature:

$$E = A + B \cdot T$$

Figure 12:
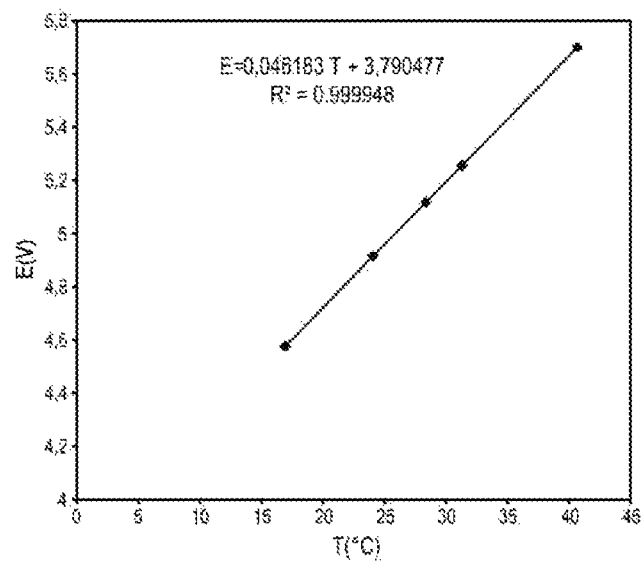
FIGS. 12 and 13 show measurement curves according to the invention for a thermo-anemometer according to the invention.

FIG. 12 shows a typical calibration example. This figure shows that the linear regression gives an excellent result.

Figure 13:
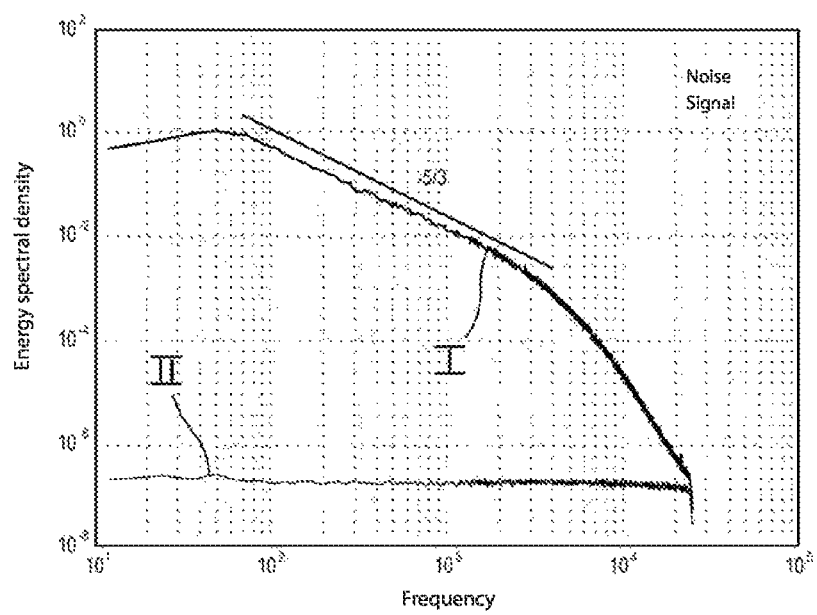

FIG. 13 contains a plot (curve I) showing an energy spectral density derived from a measurement of temperature fluctuations in a wind tunnel. This measurement was made at 50 kHz for 10 seconds at 3 hydraulic diameters of the jet downstream on its external envelope (mixing layer) using a probe 2 in which the diameter of the wire 20 is 0.5 µm. The flow conditions were equal to Re=55000 and Rejet=60000 (based on the hydraulic diameter of the pipes). The temperature difference between the flows was 13° C.

Curve II represents the energy spectral density of the voltage signal at the thermometer output with a resistance connected instead of the wire probe. Therefore, this density represents thermometer noise.

A different of 7 decades can be observed between the largest scales captured by the thermometer and the thermometer noise, namely in this case a ratio between the largest and smallest detectable scales of the order of 3000. In other words, the thermometer resolution in this case is about $5 \times 10^{-3}$° C.

The performances obtained with this resolution and a spectral energy density with such a large amplitude between large and small scales are hitherto unknown.

The probe according to the invention can be used to make measurements without corrections, when measurements are required in unstable situations (impact of a hot jet on a surface).

The invention also offers an improvement to thermometers to keep them stable and significantly improve their sensitivity. This gives a thermometer-anemometer with an actual signal-to-noise ratio equal to several thousand (3500 for the thermometer and 10000 for the constant voltage anemometer) when used with a small diameter wire probe according to the invention.

With the invention, a cold wire anemometer can be used without a thermocouple to give a measurement of the average temperature. The proposed regulation circuit can compensate for the drift and eliminate the need for a thermocouple.

The regulation circuit proposed herein may be applied to a probe according to the invention, described above in liaison with FIGS. 2A-10 and 14, or to another type of anemometric probe.

The invention claimed is:

1. Method for manufacturing a single-wire or n-wire (n>1) anemometric probe, for making measurements near a surface, comprising for at least one of the wires:
   a) positioning and holding of a straight portion of the wire, comprising a metal core with diameter d, less than 0.6 µm, surrounded by a protective sheath, on two surfaces,
   b) elimination of a part of the sheath, to expose an active wire measurement zone with length l, the l/d ratio being between 600 and 1500,
   c) the wire is soldered on two pins of the probe.

2. Method according to claim 1, for making an anemometric probe with at least two wires, including the use of steps a)-c) for a first at least one of said wires and then the use of steps a)-c) for a second of said wires.

3. Method according to claim 1, the probe being a multi-wire probe, the wires being parallel or arranged in "X".

4. Method according to claim 1, the wires being separated by a distance between 0.2 mm and 1 mm, or between 0.3 mm and 0.8 mm.

5. Method according to claim 1, step b) comprising, for at least one of the wires or each wire:
   positioning of a first part of the wire on the first of the two surfaces, and fixing this first part of the wire onto this first surface using a first drop of an attachment material;
   positioning of the second part of the wire on the second of the two surfaces and fixing this second part of the wire on this second surface using a second drop of an attachment material.

6. Method according to claim 1, comprising, for at least one of the wires or each wire, formation of a wire curvature after step a).

7. Method according to claim 6, the curvature being formed by moving the two surfaces on which the wire is arranged towards each other.

8. Method according to claim 1, step b) comprising, for at least one wire or each wire, stripping of the wire sheath to form an active measurement zone.

9. Method according to claim 8, step b) comprising, for at least one of the wires or each wire:
   a first acid pickling step,
   a second electrochemical stripping step.

10. Method according to claim 8, comprising, for at least one wire or each wire, a measurement of the wire resistance to determine the stripped length.

11. Method according to claim 8, stripping being done using a loop formed by a wire on which a drop of stripping liquid can be held.

12. Method according to claim 1, also comprising, for at least one of the wires or each wire, an annealing step at a temperature significantly higher than the temperature at which the wire will be used.

13. Method according to claim 1, soldering being done by a hot air gun or by laser impact.

14. Method according to claim 1, comprising a preliminary wire straightening step, before step a).

15. Method according to claim 1, in which step c) is done using a tin-lead type solder.

16. Single-wire anemometric probe, or n-wire (n>1) anemometric probe for making a measurement near a surface, comprising:
   a) at least two holding pins,
   b) at least one of the wires, soldered on said pins, comprising a straight portion of the wire, comprising a metal core with diameter d, less than 0.6 μm surrounded by a protective sheath, part of the sheath being eliminated, to expose an active wire measurement zone with length l, the l/d ratio being between 600 and 1500.

17. Probe according to claim 16, the probe being a multiple wire probe in which the wires are parallel or arranged in "X".

18. Probe according to claim 16, the wires being separated by a distance between 0.2 mm and 1 mm, or between 0.3 mm and 0.8 mm or being arranged in planes parallel to each other and being separated by a distance between 0.2 mm and 1 mm, or between 0.3 mm et 0.8 mm.

19. Multiple wire anemometric probe for making a measurement near a surface, in which the wires are parallel or arranged in "X", comprising:
   a) at least two holding pins,
   b) at least one of the wires, soldered on said pins, comprising a straight portion of the wire, comprising a metal core with diameter d, less than 0.6 μm, surrounded by a protective sheath, part of the sheath being eliminated, to expose an active wire measurement zone with length l, the l/d ratio being between 600 and 1500.

* * * * *